Dec. 7, 1965    R. W. ANTHONY    3,221,608
BROACHING APPARATUS
Filed July 24, 1961
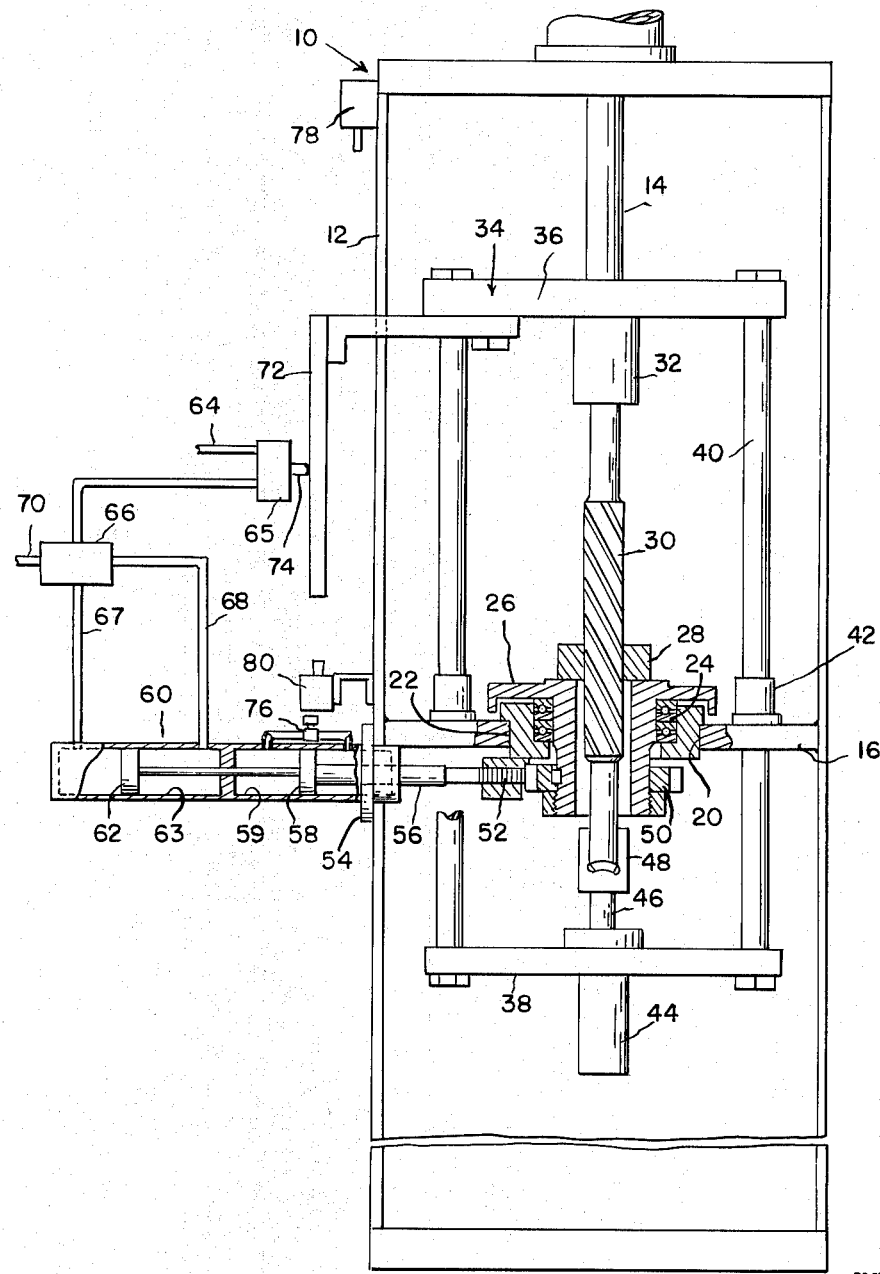
INVENTOR.
RUSSEL W. ANTHONY
BY Whittemore,
Hulbert & Belknap
ATTORNEYS United States Patent Office 3,221,608
Patented Dec. 7, 1965

3,221,608
BROACHING APPARATUS
Russel W. Anthony, Detroit, Mich., assignor to National Broach & Machine Company, Detroit, Mich., a corporation of Michigan
Filed July 24, 1961, Ser. No. 126,238
6 Claims. (Cl. 90—95)

The present invention relates to broaching apparatus, and more particularly, to broaching apparatus used for the production of parts having helical surfaces.

It is an object of the present invention to provide broaching apparatus designed to eliminate or minimize errors attributable to failure to produce the required relative rotation between a broaching tool and the work piece required by the production of helical surfaces on the work piece.

More specifically, it is an object of the present invention to provide means effective to produce a biasing torque between a helical broach and a work piece in the direction required by the coaction between helically arranged teeth on the broach and the helical surface formed thereby on the work piece.

Still more specifically, it is an object of the present invention to provide broaching apparatus comprising a broach support and a work support, means mounting one of the supports for movement in a broaching stroke relative to the other support, means mounting one of said supports against rotation and means mounting the other of said supports for rotation about its axis, and means for applying a torque to said rotary support having a magnitude substantially to balance the frictional resistance to rotation of said rotary support.

It is a further object of the present invention to provide a broaching machine for broaching helical parts comprising a rotary work support, and means connected to said support to rotate it at the approximate rate required by relative axial movement between the work support and a helical broach, with an applied torque approximately equal to that required to overcome frictional resistance to rotation of the work support under load.

Other objects and features of the invention will become apparent as the description proceeds, especially when taken in conjunction with the accompanying drawings, illustrating a preferred embodiment of the invention, wherein:

The figure is a diagrammatic elevational view, partly in section, of broaching apparatus constructed in accordance with the present invention.

In the broaching of helical parts such for example, as helical splines in a hole in a work piece, it is common practice to pull or push the spiral or helical broach through the work piece while supporting the broach against rotation, and to rely upon the formation of helical surfaces on the work piece by the broach to effect the necessary rotation of the work piece. In order to reduce the force required, it is also common practice to provide low friction bearings for the work support to minimize the torque required to effect its rotation. However, the broaching operation results in a substantial force on the work piece and hence, the bearing surface provided for rotation of the work support must be designed to withstand the cutting pressure of the broach. This in turn means that the bearings must necessarily oppose substantial resistance to rotation of the work support.

As the first few teeth of the broach engage the surface of the hole in the work piece, the contact between the broach and the work piece is not capable of producing sufficient torque to overcome the frictional resistance to rotation of the work piece. Accordingly, cuts are taken in the work piece which are not along the helical or spiral path required, and these cuts to some extent result in mutilation of material which remains in the finished piece after the broaching operation.

Obviously, after teeth or splines are cut to a fairly substantial depth, a very firm guiding action exists between the helically arranged teeth on the broach and the helical surfaces on the work piece which are being cut.

In order to reduce the magnitude of the torque applied to the work piece by the broach, so that the work piece will commence the proper rotary motion with a minimum of force applied by the broach teeth, the present invention contemplates the application of a torque to the work support in the proper direction and of a magnitude sufficient substantially to balance the frictional resistance to rotation of the work support under the pressure applied during the broaching operation, and particularly during the initial cutting while helical guiding surfaces are being established on the work piece.

Referring now to the figure, there is shown broaching apparatus comprising a hydraulic press indicated generally at 10 including a base 12 and a ram 14 movable vertically by suitable means such for example as a hydraulic piston and cylinder (not shown). The base includes a bed 16 having a central opening 20 which receives an annular bearing support 22. Ball bearings 24 are carried by the bearing support 22 and are interposed between the bearing support and a rotary work support or thrust plate 26 adapted to support an annular work piece 28.

The work piece 28, as illustrated, is to be provided with internal helical teeth or splines, and for this purpose it is operated on by a spiral or helical broach 30 which extends through a hole in the work piece and through a central opening in the elongated work support or thrust plate 26. The upper end of the broach is connected to a broach pusher 32 including releasable means for connecting it to the upper end of the broach 30. The broach pusher 32 is carried by a slide 34 including an upper cross bar 36 connected to the ram 14, a lower cross bar 38, and guide bars 40. The guide bars 40 extend through guide bushings 42 carried by the base 12.

Carried by the lower cross bar 38 of the slide 34 is a broach handling cylinder 44 which includes a vertically movable piston therein connected to a piston rod 46, at the upper end of which is a receptacle 48, adapted to engage and support the lower end of the broach 30.

In operation, the broach element 30 moves downwardly from the illustrated position until the reduced upper end of the broach occupies the broach hole in the work piece 28. At this time, suitable means release the broach from the broach pusher and the piston connected to the piston rod 46 moves downwardly in the cylinder 44, thus separating the upper end of the broach from the broach pusher 32. This permits removal of the broached work piece. Thereafter, the piston within the cylinder 44 moves upwardly to again engage the upper end of the broach in the broach pusher, at which time the broach slide moves upwardly to position the lower end of the broach 30 sufficiently above the work support 26 to permit movement of a work piece into broaching position. The broach handling cylinder is actuated to cause the piston to move downwardly below the lower end of the broach to provide for placement of a work piece on the work support 26, after which the receptacle 48 is reengaged with the lower end of the broach for the succeeding operation.

It will be observed that as the lower sections of helically arranged teeth on the spiral broach engage the work piece, they will cut helical teeth or splines therein only if the work piece rotates in properly timed relation to downward movement of the broach. Rotation of the work piece of course is facilitated by reason of the bearings 24 supporting the rotary work support or thrust plate for rotation.

However, rotation of the work support is opposed by friction to some degree and this friction cannot be overcome until there has been some appreciable cutting at the interior of the work piece by the teeth of the broach.

In order to eliminate so far as possible errors in the finished work attributable to its failure to commence rotation upon initial engagement with the teeth of the broach, means are provided for applying a biasing torque to the rotary work support in the direction required by the hand of the helical teeth on the broach, the magnitude of this torque being controlled substantially to balance the friction opposing rotation of the work support under the loading imposed by the cutting thrust of the broach. Specifically, torque is applied by providing a pinion 50 on the lower end of the work support in mesh with a rack 52 mounted for horizontal reciprocating movement in a guide 54 carried by the bed 16. The rack 52 has a piston rod 56 connected to a first piston 58 located in an oil cylinder 59 located in one end of an air-hydraulic cylinder 60 and extending through a central partition to a second piston 62 which is movable in the air cylinder 63. Air is applied to one end or the other of the air cylinder 63 from an air pressure source through a conduit 64, pressure regulating valve 65, and control valve 66. The control valve 66 has a passage 67 adapted to connect to the left hand end of the air cylinder 63, and a conduit 68 connected to the right hand end of the air cylinder. An exhaust conduit 70 is also connected to the valve 66. The valve 65 controls the pressure at which air is supplied to the air cylinder 63 and is adapted to be regulated by means responsive to the movement of the broach. This means is illustrated herein as a cam bar 72 movable with the broach slide 34 and having a cam surface engaging a plunger 74 which controls the pressure at which the pressure regulating valve 65 regulates.

Means are provided for adjusting and controlling the speed of rotation of the work support 26 by the air-hydraulic cylinder. Since the air piston 62 is connected by a common piston rod to the oil piston 58, it will be observed that movement of the air piston results in corresponding movement of the oil piston. Movement of the oil piston displaces oil from one end of the oil cylinder 59 to the other and this flow may be through an integral return passage having an adjustable restriction therein controlled by a needle valve indicated at 76. The control valve 66 may be solenoid actuated and suitably controlled in accordance with movement of the broach slide 34 by switches 78 and 80 engageable by switch actuating surfaces movable with the broach slide 34.

By suitable adjustment of the restriction in the oil flow, accomplished by adjustment of the needle valve 76, and by a proper control of air pressure applied to the air cylinder 63, rotation may be imparted to the workpiece 28 by the rotating or biasing means shown so that the work piece is rotating at approximately the required speed upon initial engagement between the work piece and the broach. The force applied to effect rotation of the work piece, as controlled by the air pressure, is approximately equal to the force required to overcome the frictional resistance to rotation of the rotary work support 26 under broaching load.

Accordingly, the tendency for the broach to move an appreciable distance in cutting relation relative to the work piece before rotation of the work piece is initiated, is eliminated. Moreover, it is not necessary that the speed of rotation of the work piece be exactly controlled because the forces inducing rotation of the work piece at this time are substantially equal to the forces required to overcome the existing frictional resistance to rotation. Thus, as the first few teeth of the broach move into cutting and hence, into guiding relation with respect to the work piece, relatively much greater guiding forces are established between the broach and the work piece. The biasing means is also very useful in connection with form relieved finishing shells which are mounted on the trailing end of a roughing broach. Since the finishing shells are form or side relieved, they are less effective to maintain helical guiding action than would otherwise be the case, and the biasing means tends to maintain correct guiding action between the shell and work with a minimum of required guiding force.

The purpose of employing means for regulating the air pressure, such as the cam 72, is to permit variation in the air pressure applied as required during the initial cut, while firm mechanical guiding interaction is established between the broach and the work piece.

It should be particularly noted that the present invention does not attempt to provide accurate guiding rotation of the work piece of the type which might be provided by a guide bar and nut. The use of guide bars and nuts with or without reduction gearing, has been employed and is subject to the objection that the guiding action thus produced may not in all cases correspond exactly to the relative movement required by the helical surfaces on the broach. In accordance with the present invention, the ultimate accuracy of the work piece is determined by the accuracy with which the teeth are formed on the broach and in general, this accuracy is greater than can be established and maintained by providing for a positive mechanical rotation of the work piece or broach as the two are moved relative to each other in a direction parallel to the axis of the broach. The rotation imparted to the work piece is non-positive in nature and while it may be adjusted into substantially the exact required rate, nevertheless, the interengagement between the broach and the work piece is relied upon for the final rotational guiding action.

By the present invention the work piece will be rotating at substantially the required speed when it is first engaged by teeth at the leading end of the broach. This rotation continues at substantially the exact required rate throughout the brief interval during which the teeth at the leading end of the broach cut helical surfaces on the work piece to a depth sufficient to establish a true mechanical positive guiding action. At this time rotation of the work piece is accomplished exclusively by its engagement with the broach, the continued operation of the biasing means merely relieving the broach of the effort required to overcome frictional resistance to rotation of the work support 26 and the work piece carried thereby.

The drawing and the foregoing specification constitute a description of the improved broaching apparatus in such full, clear, concise and exact terms as to enable any person skilled in the art to practice the invention, the scope of which is indicated by the appended claims.

What I claim as my invention is:

1. Broaching apparatus for broaching helical parts with an axially elongated broach having cutting elements disposed in a helical path comprising a frame, a work support on said frame, a broach support on said frame, means for moving one of said supports on said frame relative to the other in a direction parallel to the axis of the broach, means connecting one of said supports to said frame against rotation about said axis, means connecting the other of said supports to said frame for rotation thereon to define a rotary support, means connected between said frame and said rotary support to apply a torque tending to rotate said rotary support at a rate required by the rate of relative movement between the broach and work piece in a direction parallel to the axis of the broach and the helix angle of the teeth on the broach, and means for limiting the magnitude of the torque available to rotate said rotary support to a magnitude effective substantially to balance frictional resistance to rotation of said rotary support on said frame.

2. Broaching apparatus for broaching helical parts with an axially elongated broach having cutting elements disposed in a helical path comprising a frame, a work support on said frame, a broach support on said frame, means for moving one of said supports on said frame relative to the other in a direction parallel to the axis of the broach, means connecting one of said supports to said frame against rotation about said axis, means connecting the other of said supports to said frame for rotation thereon to define a rotary support, and means connected between said frame and said rotary support to apply torque to said rotary support in the direction of rotation required by passage of the broach axially in cutting relation to a work piece on said work support and means for limiting the torque available to rotate said rotary support to a magnitude substantially sufficient to balance frictional resistance to rotation of said rotary support on said frame.

3. Broaching apparatus for broaching helical parts with an axially elongated broach having cutting elements disposed in a helical path comprising a frame, a work support on said frame, a broach support on said frame, means for moving one of said supports on said frame relative to the other in a direction parallel to the axis of the broach, means connecting one of said supports to said frame against rotation about said axis, means connecting the other of said supports to said frame for rotation thereon to define a rotary support, rack and pinion means connected between said frame and said rotary support, and a fluid actuated motor connected to said rack and pinion means to apply torque to said rotary support in the direction of rotation required by passage of the broach axially in cutting relation to a work piece on said work support of a magnitude substantially to balance frictional resistance to rotation of said rotary support on said frame, and means to control the pressure of fluid supplied to said motor to limit the available torque to such magnitude.

4. Broaching apparatus comprising a stationary base, a bearing on said base, an annular rotary work support on said bearing, a broach slide on said base movable parallel to the axis of rotation of said work support, means on said slide for connecting said slide to a helical broach, a pinion connected to said rotary work support, a rack slidable on said base and in mesh with said pinion, and fluid pressure actuated means for biasing said rack to apply a torque to said work support in the direction of rotation required of the work support as a result of engagement between a helical broach and a work piece carried by the rotary work support and of a magnitude substantially to balance the frictional resistance to rotation of said work support, and means for controlling the pressure of fluid supplied to said motor to limit the torque available to rotate said work support to such magnitude.

5. Broaching apparatus comprising a frame, a work support and a broach support carried by said frame, said broach support being adapted to carry a broach having a helically disposed series of cutting teeth, means connecting one of said supports to said frame with provision for rectilinear movement thereon in a direction parallel to the axis of said broach and means connecting the other of said supports to said frame with provision against rectilinear movement parallel to the axis of said broach, means connecting one of said supports to said frame with provision for rotation about the axis of said broach and means connecting the other of said supports to said frame with provision against rotation thereof, means for effecting rectilinear movement of the rectilinearly movable support at a predetermined rate, and means for biasing said rotary support for rotation at a controlled rate dependent on the rate of movement of said rectilinearly movable support and the helix angle of the helically disposed teeth on the broach, in which the means for biasing the rotary support for rotation comprises a hydraulic fluid piston and cylinder device, and means for adjusting the rate of flow of hydraulic fluid out of said cylinder.

6. Broaching apparatus as defined in claim 5 in which the means for biasing said rotary support comprises an air actuated piston and cylinder device in alignment with the hydraulic fluid piston and cylinder device, and in which the pistons in said devices are interconnected for simultaneous movement, means for supplying air to the air cylinder at a controlled pressure, and in which the means for adjusting the rate of flow of hydraulic fluid out of the hydraulic cylinder comprises metering means for regulating the rate of displacement of hydraulic fluid from one end of the hydraulic cylinder to the other during movement of the piston therein so as to regulate the rate of movement of both of said pistons.

References Cited by the Examiner
FOREIGN PATENTS

| | | | |
|---|---|---|---|
| 1,394,079 | 10/1921 | Fuchs | 90—28.1 X |
| 1,925,837 | 9/1933 | Jones et al. | 90—28.1 |
| 2,315,476 | 3/1943 | Groene | 90—28.1 |
| 2,317,514 | 4/1943 | Bonnafe | 90—64 |
| 2,354,411 | 7/1944 | Thompson | 90—28.1 |
| 2,357,094 | 8/1944 | Edgar | 90—64 |
| 2,415,300 | 2/1947 | Lovely | 90—28.1 |

WILLIAM W. DYER, JR., *Primary Examiner.*

J. SPENCER OVERHOLSER, *Examiner.*